United States Patent
Brej et al.

(10) Patent No.: US 8,662,365 B2
(45) Date of Patent: Mar. 4, 2014

(54) HARD-SHELL CARGO CARRIER

(75) Inventors: Thaddeus T. Brej, Rocky River, OH (US); Curtis Patrick Taylor, Chagrin Falls, OH (US); Robert Schmidt, Painesville, OH (US); Winston Breeden, Chagrin Falls, OH (US)

(73) Assignee: Winston Products LLC, Cleveland, OH (US)

( * ) Notice: Subject to any disclaimer, the term of this patent is extended or adjusted under 35 U.S.C. 154(b) by 136 days.

(21) Appl. No.: 13/302,196

(22) Filed: Nov. 22, 2011

(65) Prior Publication Data

US 2012/0292358 A1 Nov. 22, 2012

Related U.S. Application Data

(60) Provisional application No. 61/416,070, filed on Nov. 22, 2010.

(51) Int. Cl.
*B60R 9/055* (2006.01)

(52) U.S. Cl.
USPC .......................................... 224/328; 224/315

(58) Field of Classification Search
USPC ............ 224/309, 328, 315; D12/413; 217/62; 220/345.2; 312/260, 311
See application file for complete search history.

(56) References Cited

U.S. PATENT DOCUMENTS

| | | | | |
|---|---|---|---|---|
| 2,501,894 A | * | 3/1950 | Eide | 206/543 |
| 2,654,516 A | * | 10/1953 | Edwards | 224/314 |
| 3,301,449 A | * | 1/1967 | Tope | 224/487 |
| D214,666 S | * | 7/1969 | Gretz | D12/413 |
| 3,481,518 A | * | 12/1969 | Anetsberger | 224/310 |
| 4,317,534 A | * | 3/1982 | Louw | 224/328 |
| 4,502,725 A | * | 3/1985 | Wiant | 296/186.4 |
| 7,503,470 B2 | * | 3/2009 | Settelmayer et al. | 224/319 |
| 2005/0194414 A1 | * | 9/2005 | Lynch | 224/401 |

FOREIGN PATENT DOCUMENTS

| | | | |
|---|---|---|---|
| DE | 4216926 | * | 6/1993 |
| EP | 0411305 | * | 3/1989 |
| EP | 0379031 | * | 9/1990 |

* cited by examiner

*Primary Examiner* — Justin Larson
*Assistant Examiner* — Scott McNurlen
(74) *Attorney, Agent, or Firm* — Cooper Legal Group, LLC

(57) ABSTRACT

A cargo carrier adapted to be removably mounted to a roof of a vehicle includes a body portion and an interior space defined by the body portion. The cargo carrier further includes a lid portion that provides access to the interior space. The lid portion is releasably attachable to the body portion by relative linear motion between the lid portion and the body portion. The cargo carrier further includes at least one mechanical fastening assembly slidingly engageable with a complementary fastening assembly, wherein the mechanical fastening assembly prevents relative motion between the lid portion and the body portion. Another embodiment of the cargo carrier includes a lid cover constructed to coact with a space defined by the lid portion and the body portion. The lid cover creates mechanical interference to prevent relative linear motion between the lid portion and the body portion.

15 Claims, 8 Drawing Sheets

HARD-SHELL CARGO CARRIER

RELATED APPLICATIONS

This application claims the benefit of U.S. Provisional Application No. 61/416,070, filed on Nov. 22, 2010, the entire disclosure of which is hereby incorporated herein by reference.

FIELD OF THE INVENTION

The present application relates generally to hard-shell cargo carriers and, more specifically, to a hard-shell cargo carrier adapted to be removably mounted to a vehicle having a lid portion and a body portion with closure components to secure the lid portion to the body portion.

BACKGROUND OF THE INVENTION

Due to their use in long distance travel, typical closure components included in a hard-shell cargo carrier are used to secure a lid or door of the carrier to a stationary portion of the hard-shell cargo carrier. When the hard-shell cargo carrier is mounted to an automobile and in motion, these closure components help ensure that a lid or door is securely fastened and remains in a shut position during use. Conventionally, manufacturers of hard-shell cargo carriers employ complicated fasteners and opening mechanisms including latches and three-bar mechanisms. The present application provides closure components that enable convenient operation, lower cost to manufacture, and dependable operation.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the present invention, a cargo carrier adapted to be removably mounted to a roof of a vehicle is provided. The cargo carrier includes a body portion. The body portion includes a bottom constructed and arranged to be mountable to the roof of the vehicle. The body portion also includes a body portion continuous sidewall extending up from the bottom, wherein the body portion continuous sidewall includes a peripheral edge. The body portion continuous sidewall and the bottom of the body portion define an interior space. The cargo carrier further includes a lid portion that provides access to the interior space. The lid portion includes a top and a lid portion continuous sidewall extending down from the top, wherein the lid portion continuous sidewall includes a peripheral edge. The lid portion is releasably attachable to the body portion by relative linear motion between the lid portion and the body portion. The cargo carrier further includes at least one mechanical fastening assembly attached to the body portion. The mechanical fastening assembly includes a securing member slidingly engageable with a complementary fastening assembly attached to the lid portion, wherein the mechanical fastening assembly prevents relative motion between the lid portion and the body portion. The cargo carrier further includes a means for attachment to the roof of the vehicle.

In accordance with another aspect of the present invention, a cargo carrier adapted to be removably mounted to a roof of a vehicle is provided. The cargo carrier includes a body portion. The body portion includes a bottom constructed and arranged to be mountable to the roof of the vehicle. The body portion further includes a body portion continuous sidewall extending up from the bottom, wherein the body portion continuous sidewall includes a peripheral edge. The body portion continuous sidewall and the bottom of the body portion define an interior space. The cargo carrier also includes a means for attachment to the roof of the vehicle. The cargo carrier further includes a lid portion that provides access to the interior space. The lid portion includes a top and a lid portion continuous sidewall extending down from the top, wherein the lid portion continuous sidewall includes a peripheral edge. The lid portion is releasably attachable to the body portion by relative linear motion between the lid portion and the body portion. The cargo carrier further includes a lid cover constructed to coact with a space defined by the lid portion and the body portion. The lid cover is connected to the body portion, and the lid cover creates mechanical interference to prevent relative linear motion between the lid portion and the body portion. The cargo carrier still further includes at least one mechanical fastening assembly attached to the body portion. The mechanical fastening assembly includes a securing member slidingly engageable with a complementary fastening assembly attached to the lid portion.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Example embodiments of a device that incorporates aspects of the present application are described and shown in the attached sketches. It is to be appreciated that the shown examples are not intended to be a limitation on the present application. For example, one or more aspects of the present application can be utilized in other embodiments and even other types of devices.

Figure 1:
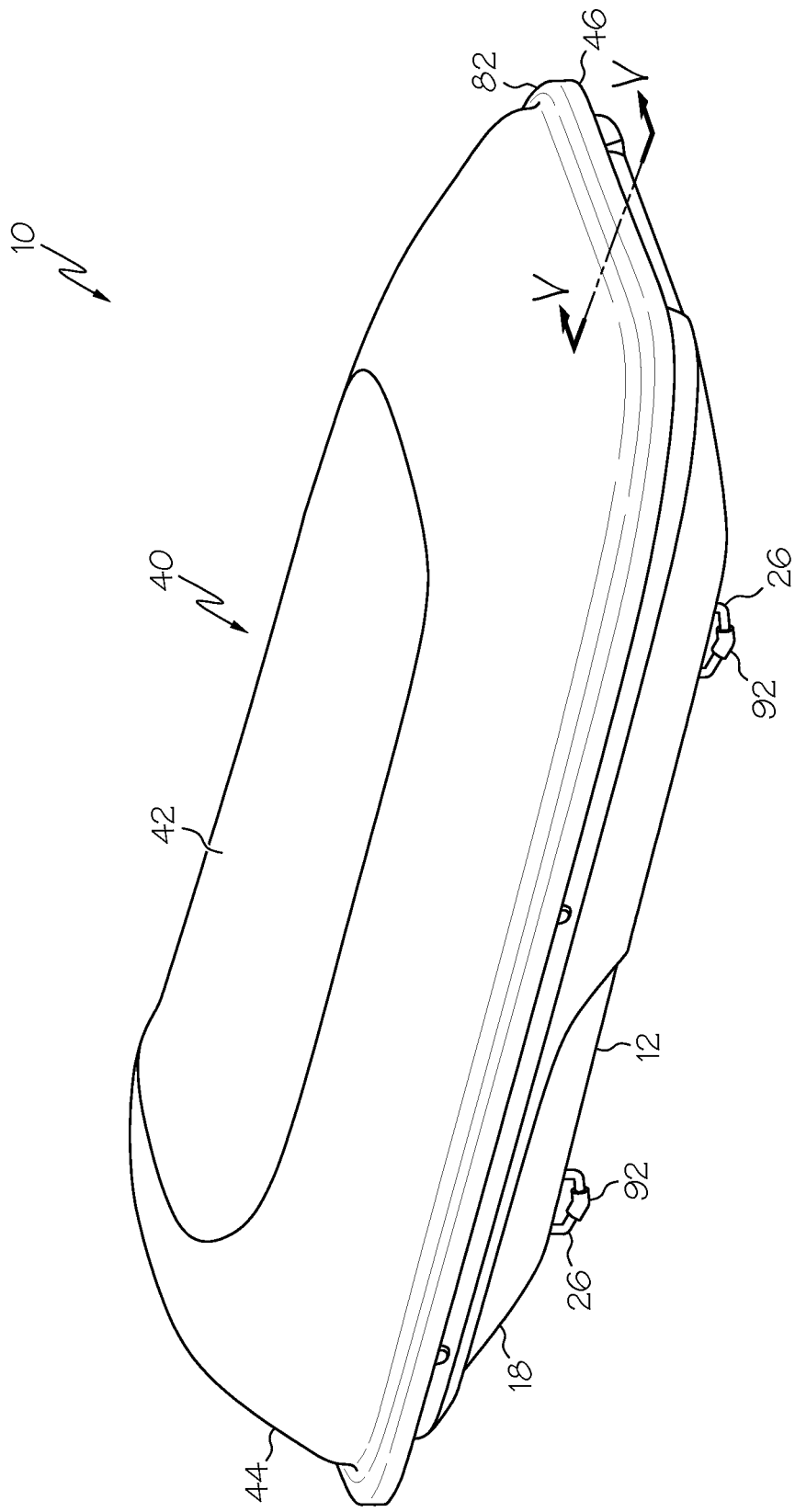
FIG. 1 is a perspective view of an example cargo carrier.
Figure 2:
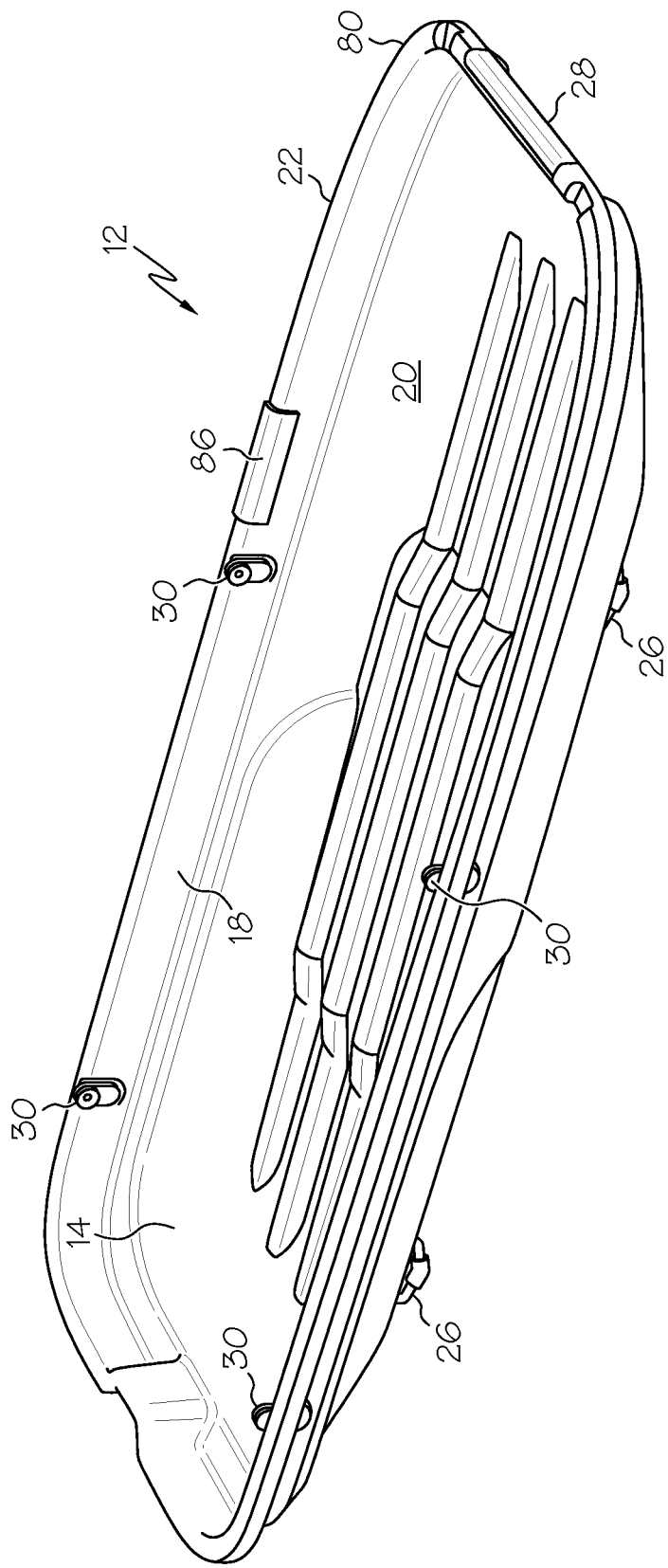
FIG. 2 is a perspective view of a body portion of the cargo carrier of FIG. 1.

Turning to the shown example of FIG. 1, an example cargo carrier 10 is provided. The cargo carrier 10 is adapted to be removably mounted to the roof of a vehicle (not shown). The cargo carrier 10 includes a body portion 12 which forms the lower part of the cargo carrier 10. Turning to FIG. 2, the body portion 12 includes a bottom 14 which forms the lower part of the body portion 12 and the bottom 14 is constructed and arranged to be mountable to the roof of the vehicle. The bottom 14 can have a flat profile or the bottom 14 can have some other cross-sectional profile such as ridges, diamond plate, or the like. A body portion continuous sidewall 18 extends up from the bottom 14 to define an interior space 20 within the body portion 12 as defined by the bottom 14 and the body portion continuous sidewall 18. The body portion continuous sidewall 18 includes a body portion peripheral edge 22.

The body portion 12 includes a means for attachment 26 to mount the body portion 12 of the cargo carrier 10 to the roof of the vehicle. The means for attachment can include U-bolts placed around vehicle roof rack structure elements (not shown) with the U-bolt ends placed through holes in the bottom of the body portion 12. The U-bolts can be a stock hardware part, or alternatively, the U-bolts can include a point at the apex of the U-shaped curve adapted to fit a variety of roof rack rails from various vehicle and after-market manufacturers. Nuts can be threadingly engaged to the ends of the U-bolts, forming a firm connection between the roof rack structure and the body portion 12. The means for attachment can alternatively or also include straps laced through engaging structure on the body portion 12 of the cargo carrier 10 and firmly attached to the vehicle. A mechanical tie-down means can also be used to attach the cargo carrier 10 to the vehicle. Alternatively, any other securement method known in the art can provide the means to attach the cargo carrier 10 to the vehicle roof.

The body portion 12 can further include a reinforced surface 28 toward the front end of the body portion 12 on the body portion continuous sidewall 18. This reinforced surface 28 can act as an area where a cargo carrier lid can interact with the body portion 12 as will be further described below. The reinforcement provided by the reinforced surface 28 can add strength to the area to better react to forces tending to lift the cargo carrier lid from the body portion 12.

Figure 3:
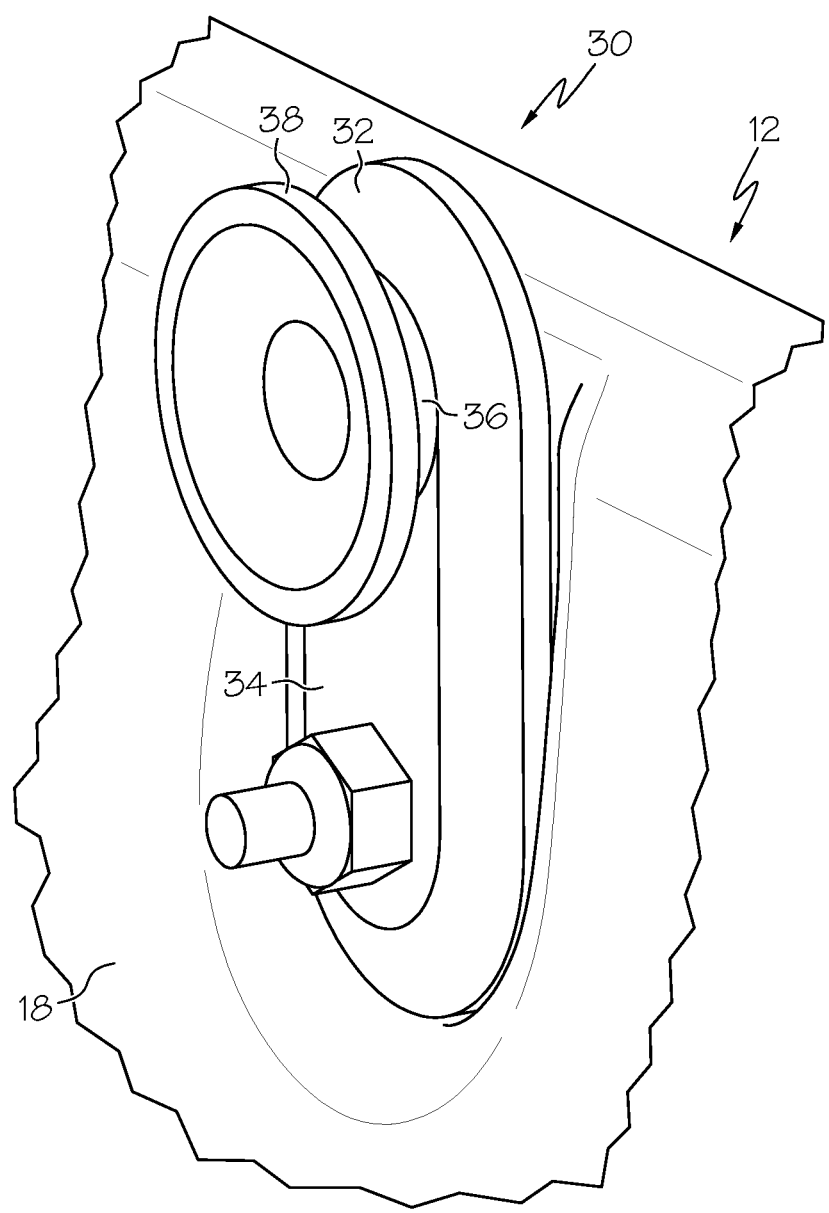
FIG. 3 is a perspective view of a mechanical fastening assembly attached to the body portion of FIG. 2.

The cargo carrier 10 also includes a least one mechanical fastening assembly 30 attached to the body portion 12 to help maintain the lid portion 40 in the shut or engaged position. FIG. 2 shows four mechanical fastening assemblies 30 attached to the body portion continuous sidewall 18. Turning to FIG. 3, the mechanical fastening assembly 30 includes a securing member slidingly engageable with a complementary fastening assembly attached to the lid portion 40. For example, the securing member attached to the body portion 12 can be spindles 32 that are bolted to the body portion continuous sidewall 18. The spindles 32 can take the shape as seen in the FIG. 3, including a generally planar surface 34 with a hole for a threaded connection attachment to the body portion 12. The spindle 32 includes structure that is adapted to coact with a complementary device. That structure can include a cylindrical structure that includes at least two different diameters. The structure can be characterized by a smaller diameter 36 closer to the planar surface 34 and a larger diameter 38 away from the planar surface 34. Alternatively, the spindle 32 can include structure that is shaped similar to a pulley, between two larger diameter flanges. In this way, the complementary device, such as a hook, can engage the spindle 32 and be held in place rather than disengaging the spindle 32 by sliding along either direction of the cylindrical structure's axis away from the planar surface. The spindle 32 can include a sloped transition between the different diameters, similar to pulleys that operate with V-belts. This design can help hold the hooks in one position, keep the lid in the shut position, and minimize vibration.

Furthermore, the cylindrical structure of the spindles 32 can be shaped like a cone, shaped as two cylinders with different diameters, a cylinder with a hole to engage an arm of a hook, or any other sliding engagement fastener structure as is known in the art. The mechanical fastening assemblies 30 are shown as nylon, but can be constructed of plastic, metal, glass-filled polymer, or any other material used for such devices as is known in the art. It is to be appreciated that any form of attachment can be used such as bolts, screws, structure molded into the continuous sidewall, plastic weld, standard weld, adhesive, etc. There can be one or more spindles 32 and complementary devices used to secure the lid to the body portion 12. The spindles 32 can be located on the body portion continuous sidewall 18 as shown in FIG. 2 with two on opposing sides, however multiple numbers and arrangements of spindles 32 are also contemplated.

Figure 4:
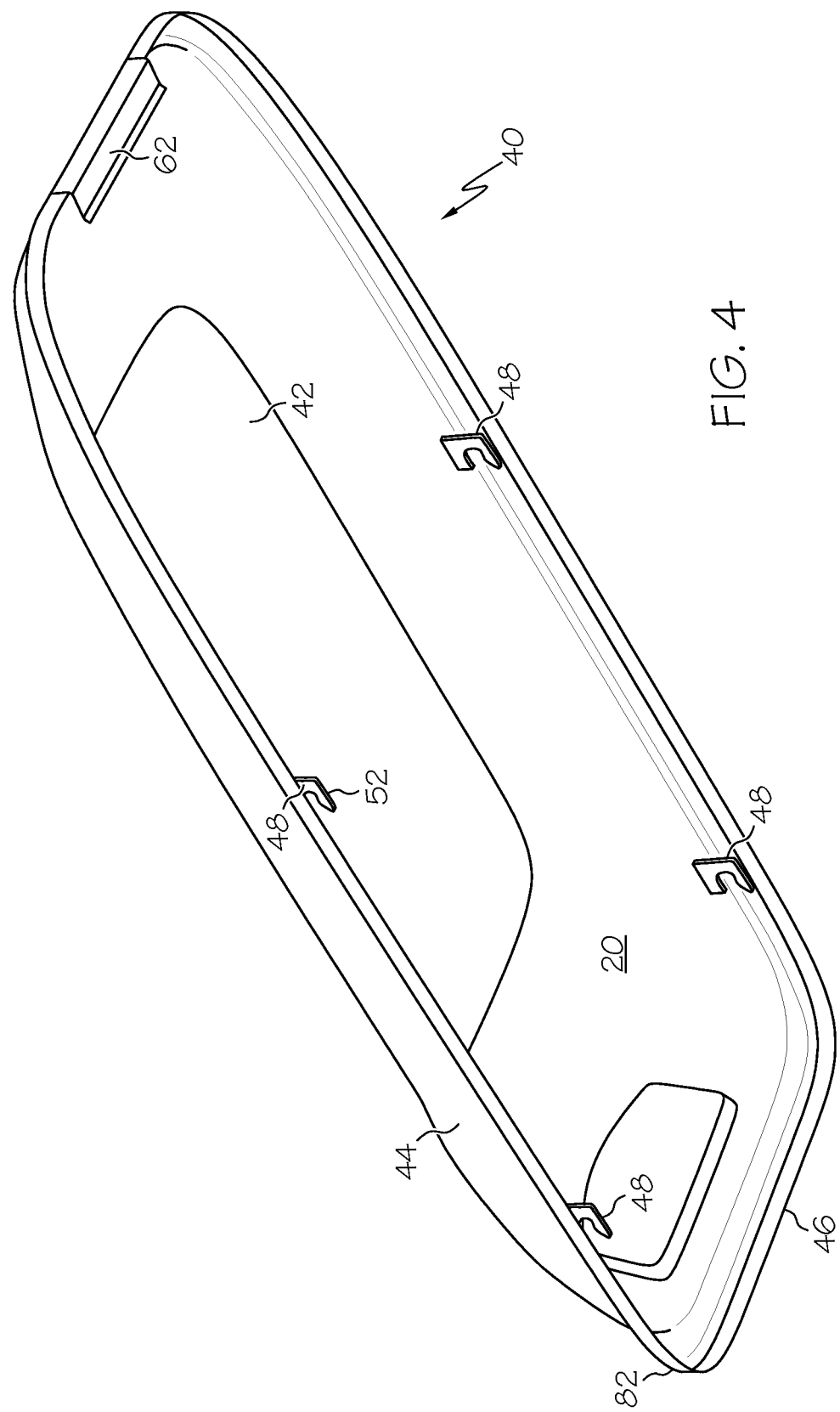
FIG. 4 is a perspective view of a lid portion of the cargo carrier of FIG. 1 as viewed from below the lid portion.

Turning to FIG. 4, the cargo carrier 10 further includes a lid portion 40 that has a perimeter shape enabling it to substantially cover an opening in the body portion 12 formed by the body portion continuous sidewall 18 (not shown). The lid portion includes a top 42 and a lid portion continuous sidewall 44. The lid portion 40 also includes a lid portion peripheral edge 46. The lid portion 40 can be constructed to have a concave shape in order to increase the interior space 20 defined by the body portion 12 and the lid portion 40 when the cargo carrier 10 is in the shut position. The lid portion 40 can be releasably attached to the body portion 12 by relative linear motion in order to provide access to the interior space 20 of the body portion 12.

The lid portion 40 also includes at least one complementary fastening assembly 48. FIG. 4 shows four complementary fastening assemblies 48 which correspond in location to the mechanical fastening assemblies 30 mounted on the body portion 12. In the example shown in FIG. 4, the complementary fastening assemblies 48 include a hook 52 that opens toward the rear of the cargo carrier 10. The hooks 52 allow sliding engagement with the spindles 32 attached to the body portion 12. The hooks 52 are shown in the FIG. 4 as stamped metal construction, but it is to be appreciated that the can be plastic, glass-filled polymer, nylon, or any other material used for such devices as is known in the art. Both the spindles 32 and the hooks 52 may be attached to the body portion 12 and lid portion 40 at depressions that are included in the body portion 12 and lid portion 40 to maximize the interior space 20 storage volume of the cargo carrier 10. Additionally, the figures show the spindles 32 attached to the body portion 12 and the hooks 52 attached to the lid portion 40, however, it is to be contemplated that the opposite can be true; the hooks 52 can be attached to the body portion 12 and the spindles 32 can be attached to the lid portion 40.

Additionally, one example of the hook 52 can include a more narrow opening that slightly compresses the smaller diameter 36 of the spindle 32 as it enters the hook 52. The smaller diameter 36 of the spindle 32 is permitted to expand as it reaches a larger interior area of the hook 52 when the hook 52 and the spindle 32 are engaged. This feature helps ensure the hook 52 and the spindle 32 remain lockingly engaged until a user intends to open the cargo carrier 10.

Figure 5:
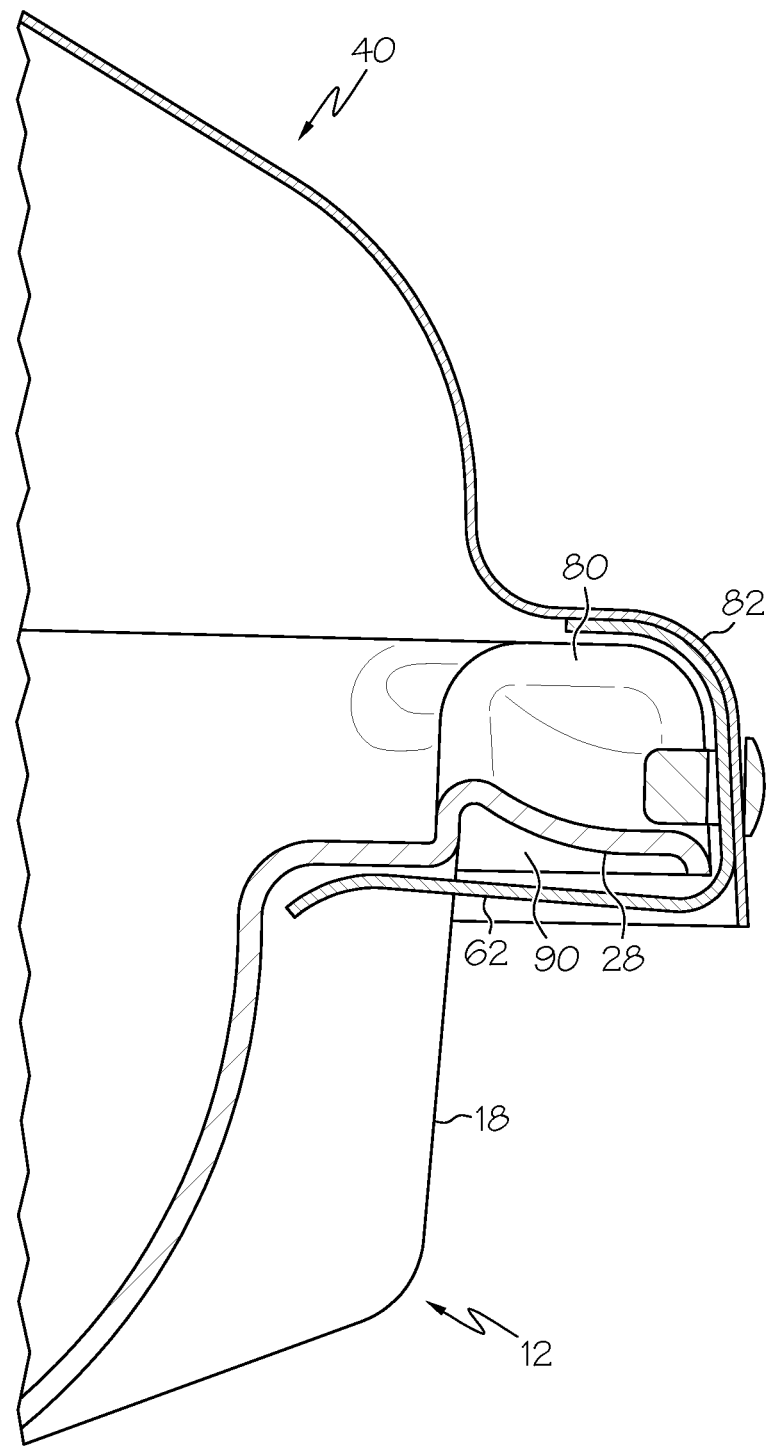
FIG. 5 is an elevation cross-section view showing the front of the body portion and the front of the lid portion of the cargo carrier of FIG. 1 with the lid portion in a shut position.

Turning to FIG. 5, additional mechanical fastening assemblies can be included on either the body portion 12 or the lid portion 40. For example, the inner side of the lid portion 40 toward the front of the vehicle can include a surface 62 that interacts with the body portion continuous sidewall 18. This surface 62 can be molded into the lid portion 40 or attached to the lid portion 40. The surface 62 shown in FIG. 5 is an extruded metal shape, but it is understood that the surface 62 may be constructed of various other materials such as plastic, glass filled polymer, wood, etc. When the lid portion 40 is engaged with the body portion 12, the extruded metal shape coacts with the reinforced surface 28 of the body portion continuous sidewall 18 to prevent an upward motion of the front of the lid portion 40. Thus, the interaction between the surface 62 and the reinforced surface 28 will help keep the lid portion 40 lockingly engaged with the body portion 12.

All of the described mechanical fastening assemblies act to hold the lid portion 40 in its shut position, particularly during vehicle motion. Furthermore, the open ends of the hooks 52 can be arranged to point toward the rear of the cargo carrier 10 so that when the vehicle is in motion, both inertia and wind resistance on the lid portion 40 will add forces to the lid portion 40 tending to urge the lid into an engaged position with the spindles 32. This is a self-locking feature of the cargo carrier 10 design.

Figure 6:
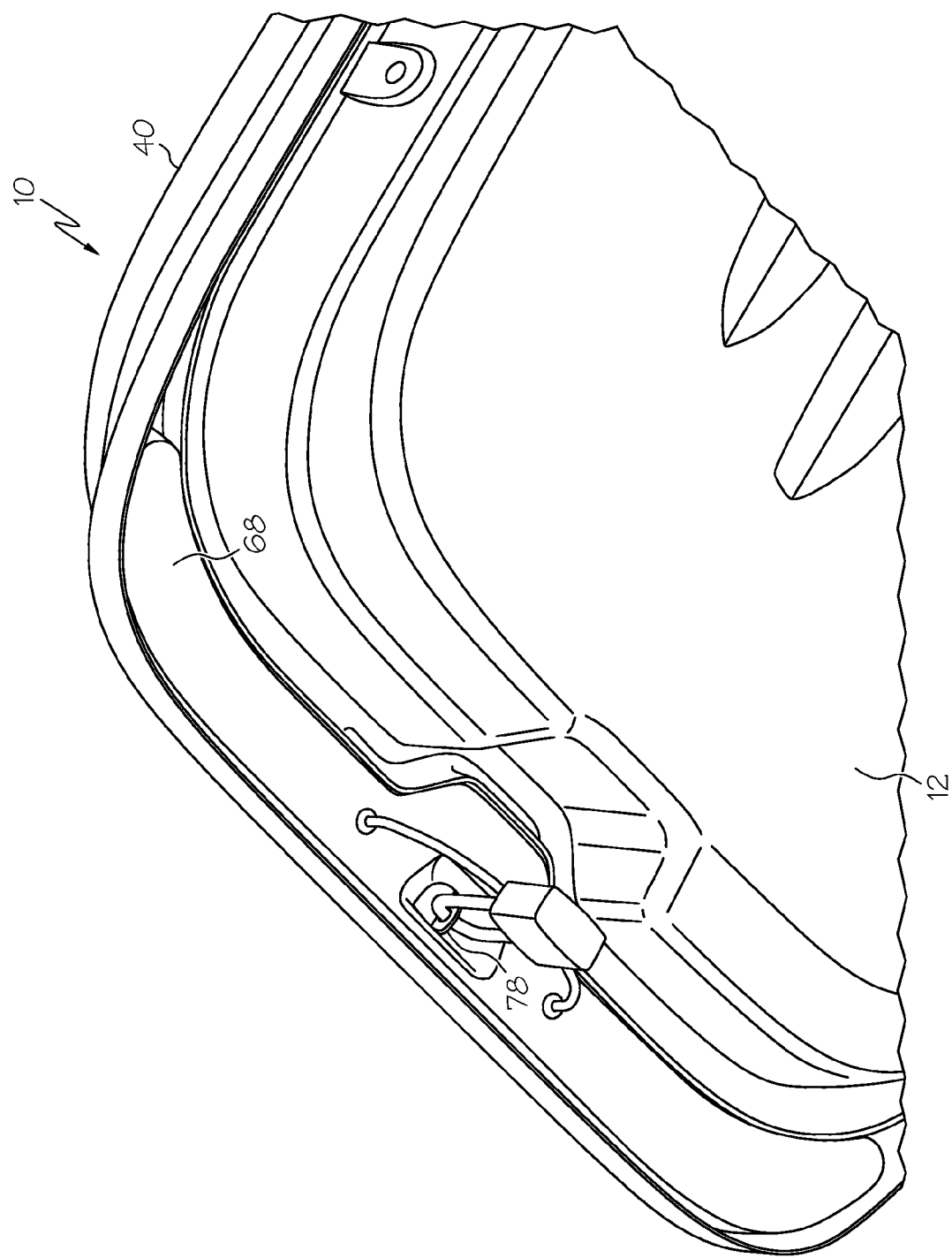
FIG. 6 is a perspective view of the lid portion, the body portion, and a lid cover of the cargo carrier of FIG. 1 as viewed from below the body portion with the lid portion in the shut position.

Turning to FIG. 6, the dimension of the lid portion 40 as measured from the forward end of the vehicle to the rear end of the vehicle (i.e., the longitudinal length) can be longer than the dimension of the top of the body portion 12 measured in the same direction. This length difference between the lid portion 40 and the body portion 12 creates an overhang and defines a space under the lid portion 40 behind the rear end of the body portion 12. The cargo carrier 10 further includes a lid cover 68 that is constructed to coact with the lid portion 40 and the body portion 12 by conforming to and fitting into the space defined under the lid portion 40 behind the rear end of the body portion 12. This space is termed the home position for the lid cover 68.

Figure 7:
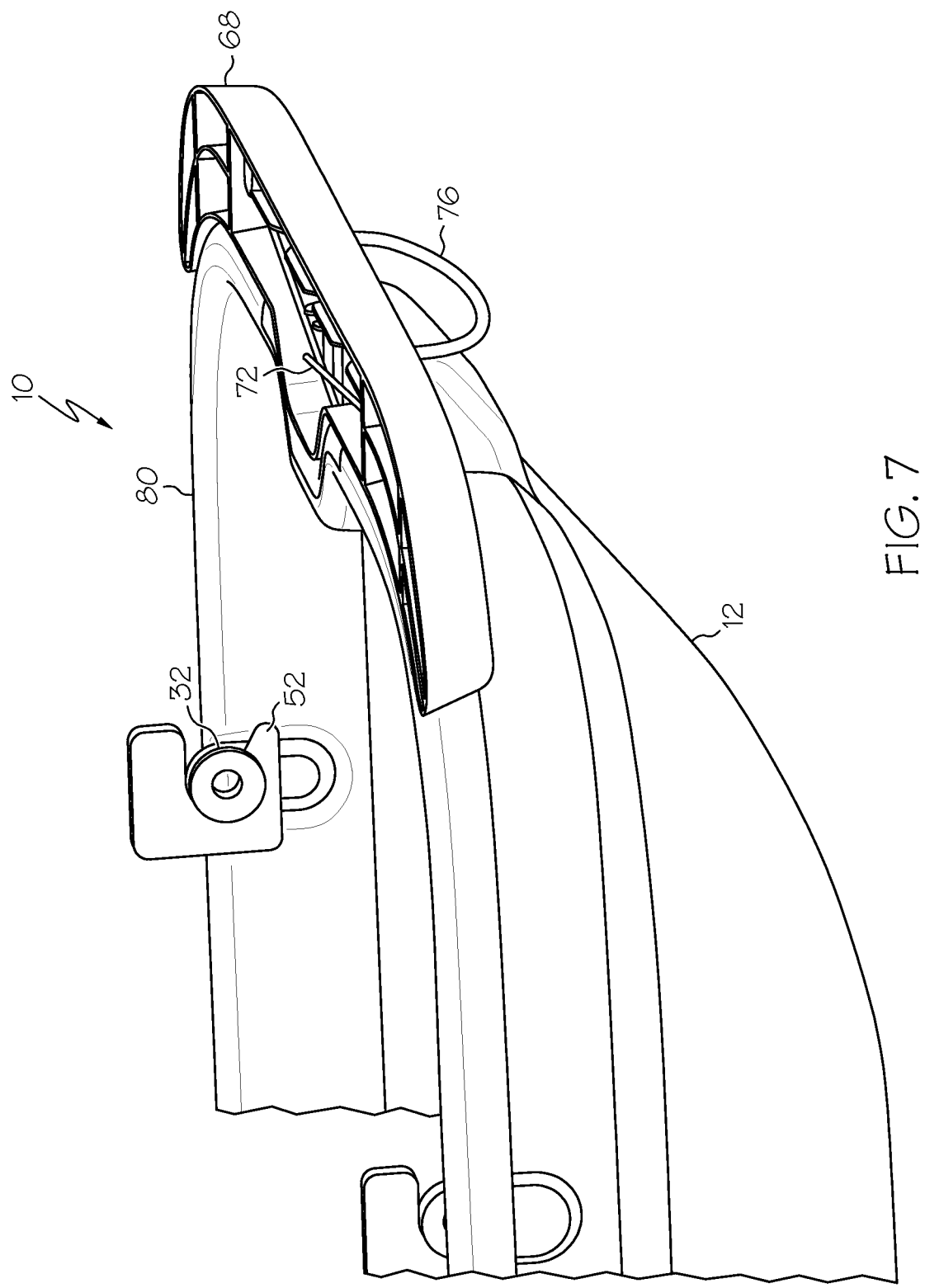
FIG. 7 is a perspective view of the body portion and the lid cover of the cargo carrier of FIG. 1 with the lid portion removed for clarity and the lid cover in its home position.
Figure 8:
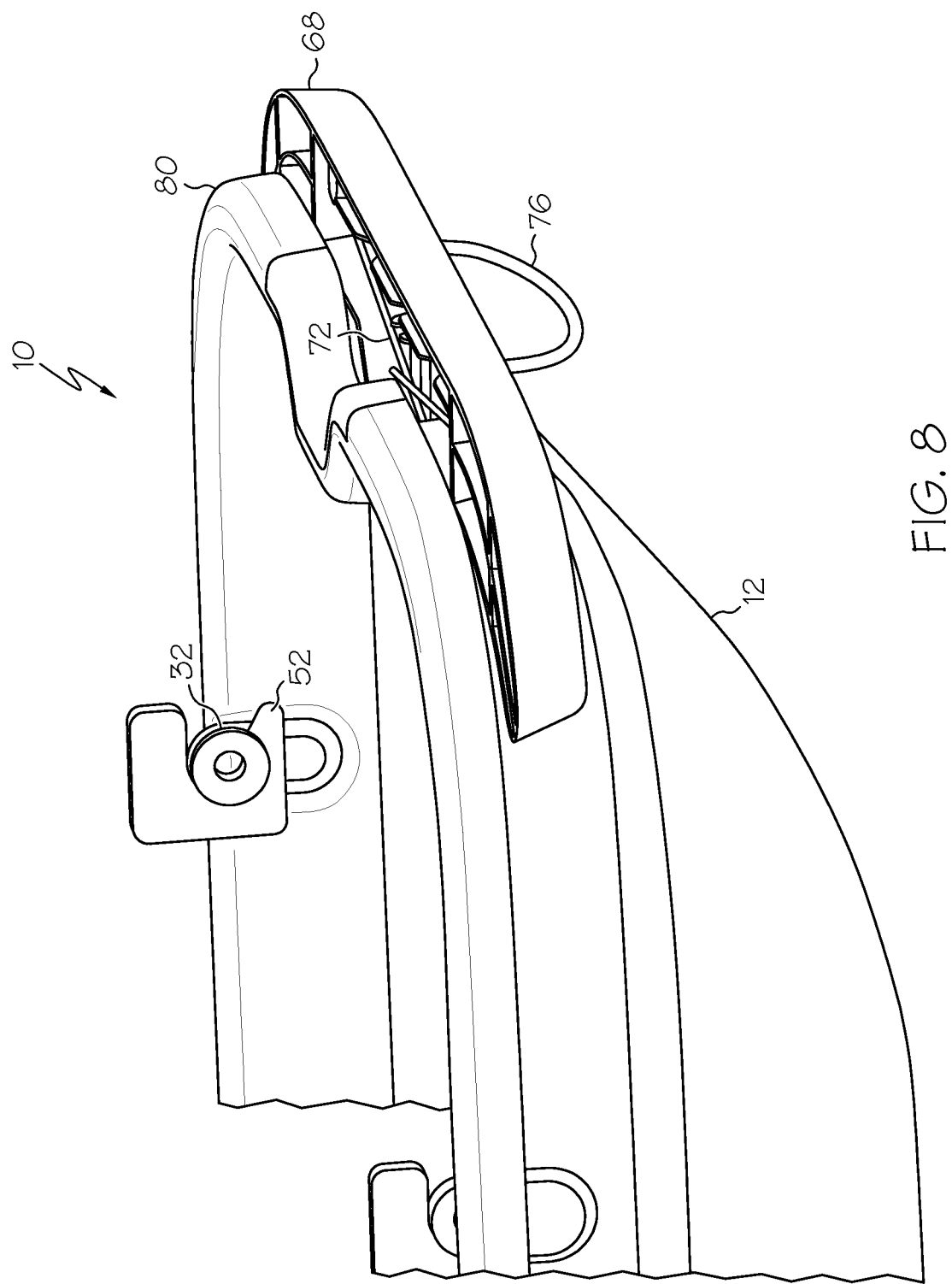
FIG. 8 is similar to FIG. 7 showing the lid cover in a position away from its home position.

Turning to FIG. 7, the cargo carrier 10 is shown with the lid cover 68 in its home position and the lid portion 40 removed for clarity. The lid cover 68 can be flexibly attached to the body portion 12 by an elastic cord system 72. Lengths of cord and tubing, for example nylon cord and latex tubing, can be connected to the lid cover 68, threaded through holes in the lid cover 68 and the body portion 12, and then connected to the body portion 12. In this way, the lid cover 68 can be moved out of its home position with an external moving force while still maintaining a physical connection to the body portion 12 as seen in FIG. 8. The lid cover 68 will tend to move back to its home position when the external moving force is removed due to retracting force of the elastic cord system 72. It is to be appreciated that the flexible attachment can also be accomplished by several different methods as are known in the art such as springs or retractable cords. The lid cover 68 can include a handle 76 for ease of moving the lid cover into and out of its home position.

Additionally, the lid cover 68 can coact with the body portion 12 to hold the lid cover 68 in a position away from its home position. For example, a user can grasp the handle 76 on the lid cover 68, move it downward and out of the space defined under the lid portion 40 behind the rear end of the body portion 12, and place the lid cover 68 in contact with the body portion continuous sidewall 18. The body portion continuous sidewall 18 can then interact with the profile of the lid cover 68 or attached structure to the lid cover 68 to hold the lid cover 68 in a position away from its home position as shown in FIG. 8.

Returning to FIG. 6, the lid cover 68 can also engage with structure 78 attached to the lid portion 40. For example, the lid cover 68 can define a slot, and the lid portion 40 can include structure 78 in the form of a tab that can be inserted into the slot. The tab of the lid portion 40 can coact with the slot defined by the lid cover 68 to create a locking arrangement. The tab of the lid portion 40 can define a hole through which a padlock or other solid device can be placed to lock the lid portion 40 in the engaged position. This locking capability can also provide a locking capability to provide a measure of security for the cargo carrier 10.

Returning to FIGS. 1 and 2, in another example cargo carrier 10, the body portion peripheral edge 22 includes an arcuate lip 80 along at least a portion of the body portion peripheral edge 22. The lid portion peripheral edge 46 of includes a congruous shape 82 along at least a portion of the lid portion peripheral edge 46. The arcuate lip 80 of the body portion 12 is configured to mate with the congruous shape 82 on the lid portion 40 to provide a locating function. As the arcuate lip 80 and the congruous shape 82 come together, they promote proper location of the lid portion 40 onto the body portion 12. In this way, the user does not have to take extra steps during the closing of the lid portion 40 to ensure that the lid portion 40 is in its proper location when shut. Additionally, the arcuate lip 80 of the body portion 12 and the congruous shape 82 included on the lid portion 40 can help eliminate wind, rain, and snow from reaching the interior space 20 by providing a tortuous path for the moisture to enter the cargo carrier 10. In this way, the contents can remain safe from moisture while enclosed within the cargo carrier 10. Furthermore, the arcuate lip 80 of the body portion 12 and the congruous shape 82 included on the lid portion 40 can help reduce wind resistance on the cargo carrier 10, thereby increasing the fuel efficiency of the vehicle when compared to a cargo carrier 10 without this arcuate lip 80.

Additionally, the arcuate lip 80 of the body portion 12 can coact with the lid cover 68 in order to hold the lid cover 68 in a position away from its home position (best seen in FIG. 8). For example, a user can grasp the handle 76 on the lid cover 68, move it downward and out of the space defined under the lid portion 40 behind the rear end of the body portion 12, and place the lid cover 68 in contact with the arcuate lip 80 of the body portion continuous sidewall 18. The arcuate lip 80 can then interact with the profile of the lid cover 68 or attached structure to the lid cover 68 to hold the lid cover 68 in a position away from its home position.

Furthermore, the arcuate lip 80 can provide structure to help engage the lid portion 40 when in the shut position. When the lid portion 40 is engaged with the body portion 12, the surface 62 can coact with the arcuate lip 80 to prevent an upward motion of the front of the lid portion 40 (best seen in FIG. 5).

In another example, the cargo carrier 10 can include a compressible, waterproof barrier material 86 at the arcuate lip 80 to prevent water and contaminant intrusion into the interior space 20. The waterproof barrier material 86 can be on at least one surface where the lid portion 40 and the body portion 12 coact (best seen in FIG. 2). The waterproof barrier material 86 can help eliminate wind, rain, and snow from reaching the interior of the cargo carrier 10, keeping the contents of the cargo carrier 10 safe from dust, moisture, wind, and other elements.

In another example, the body portion 12 further includes at least one recess 90 formed into the body portion 12 to facilitate handling of the body portion 12. The recesses 90 formed into the body portion can act as handles that enable the user to have greater control over the body portion 12 when maneuvering the body portion 12 into a preferred position on top of the vehicle or moving the body portion 12 onto or off the vehicle. Examples of recesses 90 include the space beneath the reinforced surface 28 (best seen in FIG. 5) and the space beneath the arcuate lip 80.

In another example, at least one of the body portion 12 and the means for attachment 26 to the roof of the vehicle further include a cushioning material 92 to prevent damage to the vehicle. The cushioning material can be located between the body portion 12 and the roof rack elements of the vehicle and/or between the means for attachment 26 and the roof rack elements of the vehicle (best seen in FIG. 1). The cushion material can help eliminate noise and vibration that can typically transfer between the two objects.

In another example, the footprint of the cargo carrier 10 has a substantially rectangular shape as best seen in FIG. 1. The body portion 12 and the lid portion 40 have substantially rectangular shapes in order to generally fit the roof geometry of many standard vehicles.

Further, any or all aspects of the cargo carrier 10 and especially the body portion 12, lid portion 40, and lid cover 68 can be formed using various manufacturing techniques, such as wire form, sheet metal stampings, molding operations (i.e., blow molding, injection molding, roto-molding, etc.), combinations thereof, etc. and using various materials, such as metal, plastic, fiberglass, glass-filled polymer, rubber, etc.

Prior to use of the cargo carrier 10 in transport, the user can place articles into the body portion of the cargo carrier 10. The user can then move the lid cover 68 away from its home position and place it into a position where it is held in place by the body portion continuous sidewall 18. The user can then place the lid portion 40 on top of the body portion 12, taking care to place the lid portion 40 a short distance toward the front of the vehicle from its shut or engaged position. The user can then push the lid portion 40 toward the rear of the car, thus engaging the mechanical fastening assemblies 30 to the complementary fastening assemblies 48 such as the spindle 32 and hook 52 combinations and engaging the surface 62 at the front interior of the lid portion 40 with the body portion continuous sidewall 18. The user can then move the lid cover 68 back to its home position in the space between the rear of the lid portion 40 and the rear of the body portion 12, ensuring that the tab of the lid portion 40 has passed through the slot of the lid cover 68. The arrangement of the cargo carrier 10 elements in this shut or engaged position prohibit movement of the lid portion 40 away from the body portion 12 in any given direction.

When removing the lid portion 40, the user conducts a similar process in reverse. The user can remove any locking device from the tab of the lid portion 40. The user can then grasp the handle 76 on the lid cover 68, pull it down from its home position out of engagement with the lid portion 40, and engage the lid cover 68 with the body portion continuous sidewall 18. Structure on the body portion continuous sidewall 18 will hold the lid cover 68 in a position away from its home position without any additional applied force from the user. The user can then apply a force on the lid portion 40 to urge the lid portion 40 toward the front of the vehicle, thereby disengaging the mechanical fastening assemblies 30 from the complementary fastening assemblies 48. The user can then remove the lid portion 40 from the body portion 12 by lifting it up and away from the other elements of the cargo carrier 10.

The cargo carrier 10 can provide various advantages over the prior art. One advantage is simple operation of removal of the lid portion 40: pull the lid cover 68 down, push the lid portion 40 forward, and lift the lid portion 40 off the cargo carrier 10. There is no cumbersome hinged lid that can fall back into place due to lack of opening force or inclement weather such as a gust of wind. The user also does not have to operate complicated mechanisms such as three bar or four bar mechanisms in order to operate the cargo carrier 10.

Cargo carrier 10 also enables simple operation of replacing the lid portion 40: put the lid portion 40 onto the body portion 12 slightly forward of the shut or engaged position, push the lid portion 40 in linear translation to the shut position, and replace the lid cover 68 to its home position. The lid cover then provides mechanical interference preventing the reverse linear translation of the lid portion 40. The user does not have to have to worry about complicated mechanisms or exert the effort to make sure that the complicated mechanisms of other designs are properly operated. The user simply has to slide the lid portion 40 into place.

Lower cost of manufacturing is another advantage of the described cargo carrier 10. The cargo carrier 10 does not include expensive hinges such as piano hinges. Many hinge assemblies of previous designs are expensive to both manufacture and install properly into cargo carrier assemblies. Each of the mechanical fastening assemblies 30 can be stock hardware items. The user can attach the body portion 12 of the cargo carrier 10 to the vehicle roof rack with U-bolts and nuts. The surface 62 of the lid portion 40 that engages the body portion continuous sidewall 18 can be a stock aluminum extrusion. The mechanical fastening assemblies 30 that hold the lid portion 40 to the body portion 12 can be stock nylon spindles that are attached to the body portion continuous sidewall 18 with nuts and bolts. Likewise, the hooks 52 attached to the lid portion 40 can be stock hooks attached to the lid portion 40 with nuts and bolts. Finally, the lid cover 68 can be attached to the body portion 12 via nylon cord and rubber tubing.

It is another advantage of the cargo carrier 10 is the incorporation of multiple points of engagement between a lid portion 40 and a body portion 12. The multiple points of engagement decrease the likelihood of failure in the event that one point of engagement is loose, was not engaged by the user, fails during operation, etc.

It is another advantage of the cargo carrier 10 to allow ease of security for the articles within the cargo carrier 10. One locking device fastened through the tab of the lid portion 40 effectively locks the entire perimeter of the lid, as the mechanical fastening assemblies 30 prohibit vertical separation of the lid portion 40 away from the body portion 12. Additionally, the mechanical fastening assemblies 30 prevent prying the lid portion 40 away from the body portion 12.

The invention has been described with reference to various example embodiments. Obviously, modifications and alterations will occur to others upon a reading and understanding of this specification. It is intended to include all such modifications and alterations.

What is claimed is:

1. A cargo carrier adapted to be removably mounted to a roof of a vehicle, the cargo carrier including:
   a body portion including:
     a bottom constructed and arranged to be mountable to the roof of the vehicle;
     a body portion continuous sidewall extending up from the bottom, wherein the body portion continuous sidewall includes a peripheral edge extending around the entirety of the body portion, the peripheral edge of the body portion including a lip, wherein the body portion continuous sidewall and the bottom of the body portion define an interior space;
   a lid portion that covers the entirety of the bottom and the interior space when attached to the body portion and provides access to the interior space when the lid portion is moved from attachment to the body portion, the lid portion including:
     a top;
     a lid portion continuous sidewall extending down from the top, wherein the lid portion continuous sidewall includes a peripheral edge extending around the entirety of the lid portion, the peripheral edge of the lid portion including a lip;

wherein the lid portion is releasably attachable to the body portion by relative linear motion between the lid portion and the body portion, with the peripheral edge of the lid portion covering the entirety of the peripheral edge of the body portion;

at least one mechanical fastening assembly attached to the body portion, wherein the mechanical fastening assembly includes a securing member slidingly engageable with a complementary fastening assembly attached to the lid portion, wherein the mechanical fastening assembly prevents relative motion between the lid portion and the body portion, the lid portion is slid rearward relative to the body portion to slidingly engage the mechanical fastener attached to the body portion with the complementary fastening assembly attached to the lid portion;

a means, located at the rear of the cargo carrier, for preventing reverse linear movement of the lid portion forward relative to the body portion; and a means for attachment to the roof of the vehicle.

2. The cargo carrier of claim 1, wherein the lip of the peripheral edge of the body portion is an arcuate lip and the lip of the peripheral edge of the lid portion has a congruous shape, wherein the arcuate lip of the body portion is configured to mate with the congruous shape of the lid portion.

3. The cargo carrier of claim 2, wherein at least one of the body portion and the lid portion further include a compressible, waterproof barrier material at the arcuate lip to prevent water and contaminant intrusion into the interior space.

4. The cargo carrier of claim 1, wherein the body portion further includes at least one recess formed into the body portion to facilitate handling of the body portion.

5. The cargo carrier of claim 4, wherein the lid portion further includes at least one recess formed into the lid portion to facilitate handling of the lid portion.

6. The cargo carrier of claim 1, wherein at least one of the body portion and the means for attachment to the roof of the vehicle further include a cushioning material to prevent damage to the vehicle.

7. The cargo carrier of claim 1, wherein the footprint of the cargo carrier has a substantially rectangular shape.

8. A cargo carrier adapted to be removably mounted to a roof of a vehicle, the cargo carrier including:
 a body portion including:
  a bottom constructed and arranged to be mountable to the roof of the vehicle;
  a body portion continuous sidewall extending up from the bottom, wherein the body portion continuous sidewall includes a peripheral edge, wherein the body portion continuous sidewall and the bottom of the body portion define an interior space;
 a means for attachment to the roof of the vehicle;
 a lid portion that provides access to the interior space, the lid portion including:
  a top;
  a lid portion continuous sidewall extending down from the top, wherein the lid portion continuous sidewall includes a peripheral edge;
  wherein the lid portion is releasably attachable to the body portion by relative linear motion between the lid portion and the body portion;
 a lid cover constructed to coact with a space defined by the lid portion and the body portion, wherein the lid cover is connected to the body portion, and the lid cover creates mechanical interference to prevent relative linear motion between the lid portion and the body portion; and
 at least one mechanical fastening assembly attached to the body portion, wherein the mechanical fastening assembly includes a securing member slidingly engageable with a complementary fastening assembly attached to the lid portion.

9. The cargo carrier of claim 8, wherein the lid cover further includes a means of engaging a structure of the lid portion, and the interaction between the means of engagement and the structure of the lid portion help maintain the lid cover in a home position.

10. The cargo carrier of claim 8, wherein the peripheral edge of the body portion further includes an arcuate lip and the peripheral edge of the lid portion further includes a congruous shape, wherein the arcuate lip of the body portion is configured to mate with the congruous shape of the lid portion.

11. The cargo carrier of claim 10, wherein at least one of the body portion and the lid portion further include a compressible, waterproof barrier material at the arcuate lip to prevent water and contaminant intrusion into the interior space.

12. The cargo carrier of claim 8, wherein the bottom portion further includes at least one recess formed into the bottom portion to facilitate handling of the bottom portion.

13. The cargo carrier of claim 12, wherein the lid portion further includes at least one recess formed into the lid portion to facilitate handling of the lid portion.

14. The cargo carrier of claim 8, wherein at least one of the body portion and the means for attachment to the roof of the vehicle further include a cushioning material to prevent damage to the vehicle.

15. The cargo carrier of claim 8, wherein the body portion has a substantially rectangular shape.

* * * * *